United States Patent
Cullen et al.

(10) Patent No.: US 9,471,575 B2
(45) Date of Patent: *Oct. 18, 2016

(54) MANAGING CHANGES TO ONE OR MORE FILES VIA LINKED MAPPING RECORDS

(71) Applicant: INTERNATIONAL BUSINESS MACHINES CORPORATION, Armonk, NY (US)

(72) Inventors: Peter John Cullen, Hampshire (GB); John William Duffell, Winchester (GB); Sam Marland, Hants (GB); Yue Wang, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,520

(22) Filed: Aug. 29, 2014

(65) Prior Publication Data
US 2014/0372452 A1    Dec. 18, 2014

Related U.S. Application Data

(63) Continuation of application No. 13/892,436, filed on May 13, 2013, now Pat. No. 9,116,899.

(30) Foreign Application Priority Data

Jun. 28, 2012 (GB) .................................. 1211485.6

(51) Int. Cl.
*G06F 9/45* (2006.01)
*G06F 17/30* (2006.01)
(Continued)

(52) U.S. Cl.
CPC ............. *G06F 17/3007* (2013.01); *G06F 8/65* (2013.01); *G06F 8/71* (2013.01); *G06F 8/73* (2013.01)

(58) Field of Classification Search
CPC ........ G06F 8/65; G06F 17/3007; G06F 8/71; G06F 8/73
See application file for complete search history.

(56) References Cited

U.S. PATENT DOCUMENTS

| | | | |
|---|---|---|---|
| 5,047,918 A | 9/1991 | Schwartz et al. | |
| 5,890,176 A * | 3/1999 | Kish | G06F 8/71 707/999.202 |

(Continued)

FOREIGN PATENT DOCUMENTS

WO    2008063797 A2    5/2008

OTHER PUBLICATIONS

Ekwa Duala-Ekoko et al. "Tracking Code Clones in Evolving Software", [Online], IEEE 2007, pp. 1-10, [Retrieved from Internet on Jun. 18, 2016], <http://ieeexplore.ieee.org/stamp/stamp.jsp?tp=&arnumber=4222578>.*

(Continued)

*Primary Examiner* — Thuy Dao
*Assistant Examiner* — Ziaul A Chowdhury
(74) *Attorney, Agent, or Firm* — Yudell Isidore PLLC

(57) ABSTRACT

A method for managing changes to one or more files via a link is associated with the changes that result in an updated version of the one or more files. A changed section determiner determines which sections associated with the one or more files have changed. The changed section operator further determines metadata regarding the nature of the changes to the sections. Based on the metadata a metrics generator generates a first weight associated with each of the changed sections. A mapping record generator generates a mapping record for each of the changed sections. A first mapping record comprises data associated with the first weight. The first mapping record is associated with a particular version of the one or more files and is linked to mapping records associated with other changed sections using the link.

12 Claims, 9 Drawing Sheets

(51) Int. Cl.
*G06F 9/445* (2006.01)
*G06F 9/44* (2006.01)

(56) References Cited

U.S. PATENT DOCUMENTS

| | | | | |
|---|---|---|---|---|
| 8,443,354 | B1* | 5/2013 | Satish | G06F 8/65 717/104 |
| 8,806,641 | B1 | 8/2014 | Li et al. | |
| 2003/0145281 | A1* | 7/2003 | Thames | G06F 8/73 715/205 |
| 2006/0149408 | A1 | 7/2006 | Speeter et al. | |
| 2006/0168566 | A1* | 7/2006 | Grimaldi | G06F 8/73 717/123 |
| 2006/0294506 | A1 | 12/2006 | Dengler et al. | |
| 2007/0118531 | A1* | 5/2007 | Gatton | G06F 8/71 |
| 2008/0127164 | A1* | 5/2008 | Duffield | G06F 8/65 717/173 |
| 2008/0183690 | A1 | 7/2008 | Ramachandran | |
| 2008/0250392 | A1 | 10/2008 | Petri | |
| 2008/0250394 | A1* | 10/2008 | Jones | G06F 8/73 717/123 |
| 2008/0301659 | A1* | 12/2008 | Rosenberg | G06F 8/65 717/168 |
| 2009/0019046 | A1 | 1/2009 | Coley et al. | |
| 2009/0044182 | A1* | 2/2009 | Quin | G06F 8/65 717/168 |
| 2009/0044183 | A1* | 2/2009 | Quin | G06F 8/65 717/168 |
| 2009/0133006 | A1* | 5/2009 | Cheung | G06F 8/71 717/144 |
| 2009/0249291 | A1 | 10/2009 | Bak et al. | |
| 2010/0023520 | A1* | 1/2010 | Barboy | G06F 17/3007 707/E17.007 |
| 2010/0095273 | A1* | 4/2010 | Matthiesen | G06F 8/71 717/120 |
| 2011/0055165 | A1 | 3/2011 | McKay | |
| 2011/0209135 | A1 | 8/2011 | Sakuma | |
| 2011/0239191 | A1* | 9/2011 | Ramachandran | G06F 8/71 717/121 |
| 2011/0239192 | A1 | 9/2011 | Feigen | |
| 2012/0084766 | A1 | 4/2012 | Shanmugam et al. | |
| 2012/0137138 | A1* | 5/2012 | Gregorovic | G06F 17/30 713/189 |
| 2012/0143923 | A1* | 6/2012 | Whitney | G06F 17/30997 707/803 |
| 2014/0019498 | A1* | 1/2014 | Cidon | G06F 17/3007 707/827 |
| 2014/0366002 | A1* | 12/2014 | Jentsch | G06F 8/71 717/122 |
| 2015/0095378 | A1* | 4/2015 | Pomponio | G06F 8/73 707/802 |
| 2015/0220528 | A1* | 8/2015 | Huang | G06F 17/3007 707/728 |

OTHER PUBLICATIONS

Peter C. Weinstein "Ontology-Based Metadata: Transforming the MARC Legacy", [Online], ACM 1998, pp. 254-263, [Retrieved from Internet on Jun. 18, 2016], <http://delivery.acm.org/10.1145/280000/276706/p254-weinstein.pdf>.*

Dieter Van Uytvanck et al. "Semantic metadata mapping in practice: the Virtual Language Observatory", [Online], 2012, pp. 1029-1034, [Retrieved from Internet on Jun. 18, 2016], <http://pubman.mpdl.mpg.de/pubman/item/escidoc%3A1454694/component/escidoc%3A1478393/VanUytvanck_LREC_2012.pdf>.*

Thomas O. Meservy et al. "Transforming Software Development: An MDA Road Map", [Online], 2005, pp. 52-58, [Retrieved from Internet on Jun. 18, 2016], <https://www.researchgate.net/Transforming_software_development_An_MDA_road_map/links/55f0115c08ae0af8eelb57ab.pdf>.*

Great Britian Application No. GB1211485.6, Search Report Under Section 17(5), Oct. 10, 2012.

U.S. Appl. No. 13/892,436 entitled "Managing Changes to One or More Files Via Linked Mapping Records"; Non-final office action dated Sep. 26, 2014 (16 pg).

U.S. Appl. No. 13/892,436 entitled "Managing Changes to One or More Files Via Linked Mapping Records"; Notice of Allowance dated Apr. 15, 2015 (14 pg).

Arun Sen, "Metadata management: past, present and future", [Online], 2004, pp. 151-173, [Retrieved from Internet on Apr. 6, 2015], <http://eisc.univalle.edu.co/materias/KDD/download/papersExpo/dataWarehousing/metadataPaPreFu.pdf>.

Anca Vaduva et al., "Metadata Management for Data Warehousing: Between Vision and Reality", [Online], 2001, pp. 129-135, [Retrieved from Internet on Apr. 6, 2015], <http://ieeexplore.ieee.org/stamp/stamp.jsp?tp=&arnumber=938079>.

Dr. Jim Alves-Foss et al., "Experiments in the Use of XML to Enhance Traceability Between Object-Oriented Design Specifications and Source Code"[Online], 2002, pp. 1-8, [Retrieved from Internet on Apr. 6, 2015], <http://www.hicss.hawaii.edu/HICSS_35/HICSSpapers/PDFdocuments/STSSV01.pdf>.

Ra"ul Palma et al., "A Holistic Approach to Collaborative Ontology Development Based on Change Management", [Online], 2011, pp. 1-23, [Retrieved from Internet on Apr. 6, 2015], <http://m.imap.websemanticsjournal.org/index.phpips/article/viewFile/200/198>.

* cited by examiner

```
1 public class Test;
..
45    public void print4() {
46       int i = 0
47       while( i < 100 ) {
48          if(i%5 == 0) {
49             System.out.println("Your number is" +i);
50          }
51          i ++
52       }
53    }
```

```
1    import java.util.Random;
⋮
7    public void run() {
8        System.out.println("Amount of types = " + this.ArrayCounter());
9        System.out.println("Random type = "+this.getRandomElement());
⋮
16   public String getRandomElement(){
17       int length = this.ArrayCounter();
18       Random rand = new Random();
19       int random = rand.nextInt(length);
20       return types[random];
21   }
```

MANAGING CHANGES TO ONE OR MORE FILES VIA LINKED MAPPING RECORDS

PRIORITY CLAIM

The present application is a continuation of U.S. patent application Ser. No. 13/892,436, titled "Managing Changes to One or More Files Via Linked Mapping Records," filed on May 13, 2013, the contents of which is incorporated herein by reference in its entirety.

BACKGROUND

1. Technical Field

The present disclosure relates to managing changes to one or more files. In particular, the present disclosure relates to managing changes to one or more files using a link associated with changes and creating an updated version of the one or more files based on the changes.

2. Description of the Prior Art

Presently, it is difficult to identify parts of a file that need to be changed when an associated file is changed. For example, it is difficult to identify which parts of documentation for a product require updating when associated code for the product is changed, or vice versa. This can result in, for example, the documentation being out of date (e.g., because the documentation has not been updated to reflect changes in the code) or cause documentation associated with the code to be present in multiple locations and not be consistently updated in each of the locations.

At FIG. 1, there is depicted a block diagram of a prior art solution. As shown, the system comprises system 100 having client computer 105 operable to interact with server computer 107. The server computer 107 comprises coordinator 110 and version control system 115 having access to first data store 125 for storing one or more files. In the example herein, the files comprise code and associated documentation. The system further comprises linking system 120 having access to second data store 130 for storing one or more links.

At FIG. 2 there is provided a flow diagram of the process according to the prior art. At step 200, a user uses client computer 105 to make changes to code and to documentation and "commits" the changes to a change management system (e.g., server computer 107). Coordinator 110 receives the changes from client computer 105 and coordinates version control system 115 to access the files in first data store 125 and to update the relevant files (step 205). At step 210, Coordinator 110 coordinates linking system 120 to create a link. The links are created between one or more code files and one or more documentation files. Coordinator 110 coordinates linking system 120 to create a link between the code file(s) that was changed by the user and the documentation file(s) that was changed by the user. Linking system 120 links the files by use of a timestamp, wherein a code file and a documentation file are linked if they are committed at the same time. Alternatively, linking system 120 may link the files if changes associated with the file are committed under the same change item (which has an identifier) wherein a change item can be used to group changes associated with a logical unit of work. Linking system 120 stores the link in second data store 130.

The solution provided by the prior art, as described in FIGS. 1-2, is disadvantageous since this solution is coarse grained. For example, in the prior art links can only be created based on an exact timestamp or a change item. Further, it is not possible to easily identify which sections of the documentation relate to which sections of code.

SUMMARY

There is provided a method, an apparatus, and a computer program product for managing changes to one or more files via a link associated with the changes that result in an updated version of the one or more files. In a first aspect of the present disclosure there is an apparatus comprising a changed section determiner that determines which sections associated with the one or more files have changed and determines metadata regarding the nature of the changes to the sections. The apparatus may further comprise a metrics generator that uses the metadata to generate a first weight associated with each of the changed sections and a mapping record generator that generates a mapping record for each of the changed sections. The first mapping record comprises data associated with the first weight, is associated with a particular version of the one or more files, and is linked to mapping records associated with other changed sections using the link.

According to a second aspect, there is provided a method for managing changes to one or more files via a link associated with the changes that result in an updated version of the one or more files. The method further comprises determining which sections associated with the one or more files have changed, determining metadata regarding the nature of the changes to the sections, using the metadata to generate a first weight associated with each of the changed sections, and generating a mapping record for each of the changed sections. The first mapping record further comprises data associated with the first weight, is associated with a particular version of the one or more files, and is linked to mapping records associated with other changed sections using the link.

According to a third aspect, there is provided a computer program product comprising program code that when run on a computer enables the computer to perform the above method.

By creating and maintaining a link between e.g., code file(s) and documentation file(s), the present disclosure creates a dependency such that when planning any code changes, sections that require updating in the documentation can easily be found and vice versa. This allows a number of further advantages, such as an improvement in the quality of documentation created, a reduction in cost of updating documentation due to the relevant documentation requiring changes being identified automatically and without the need to rely upon a specialist with experience in the particular area, and an improved ability to plan product changes and determine the cost of such changes.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

FIG. 7 illustrates a block diagram showing an exemplary first proposed change, according to the preferred embodiment;

FIG. 8 illustrates a block diagram showing an exemplary first second and third proposed changes, according to the preferred embodiment.

DETAILED DESCRIPTION OF THE PREFERRED EMBODIMENT

There is provided a method, an apparatus, and a computer program product for managing changes to one or more files, wherein a link is associated with changes that result in an updated version of the one or more files. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Figure 1:
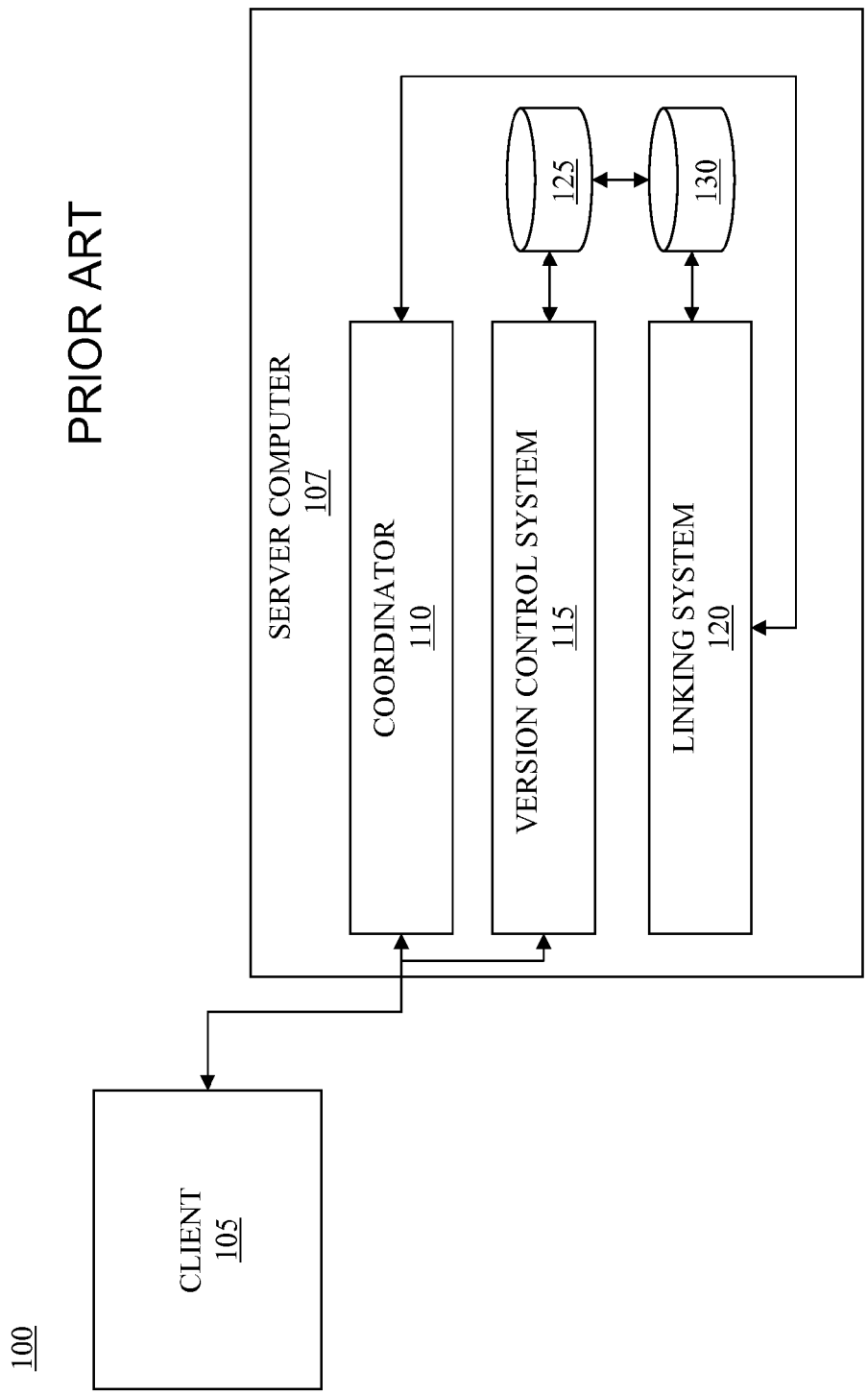
FIG. 1 illustrates a system according to the prior art.
Figure 2:
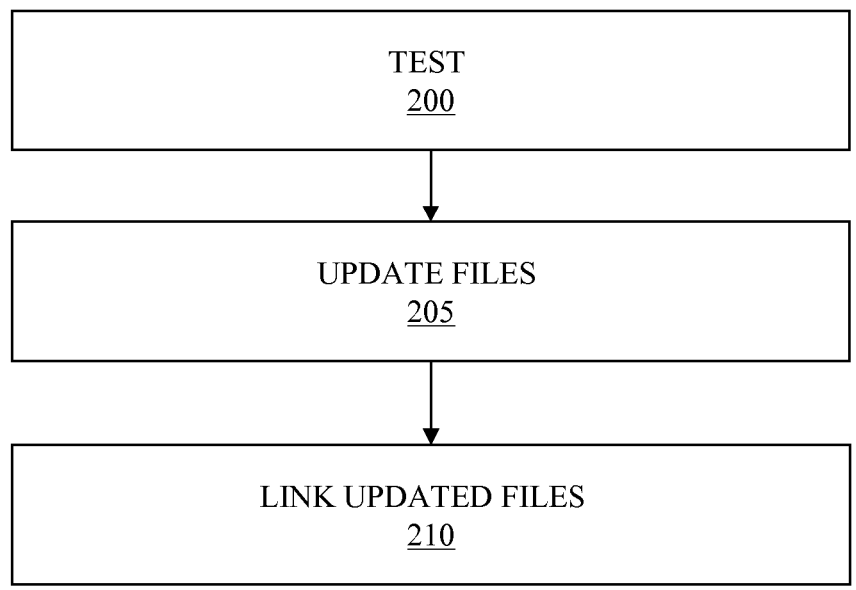
FIG. 2 illustrates a flow diagram showing the operational steps involved in a process according to the prior art.
Figure 3:
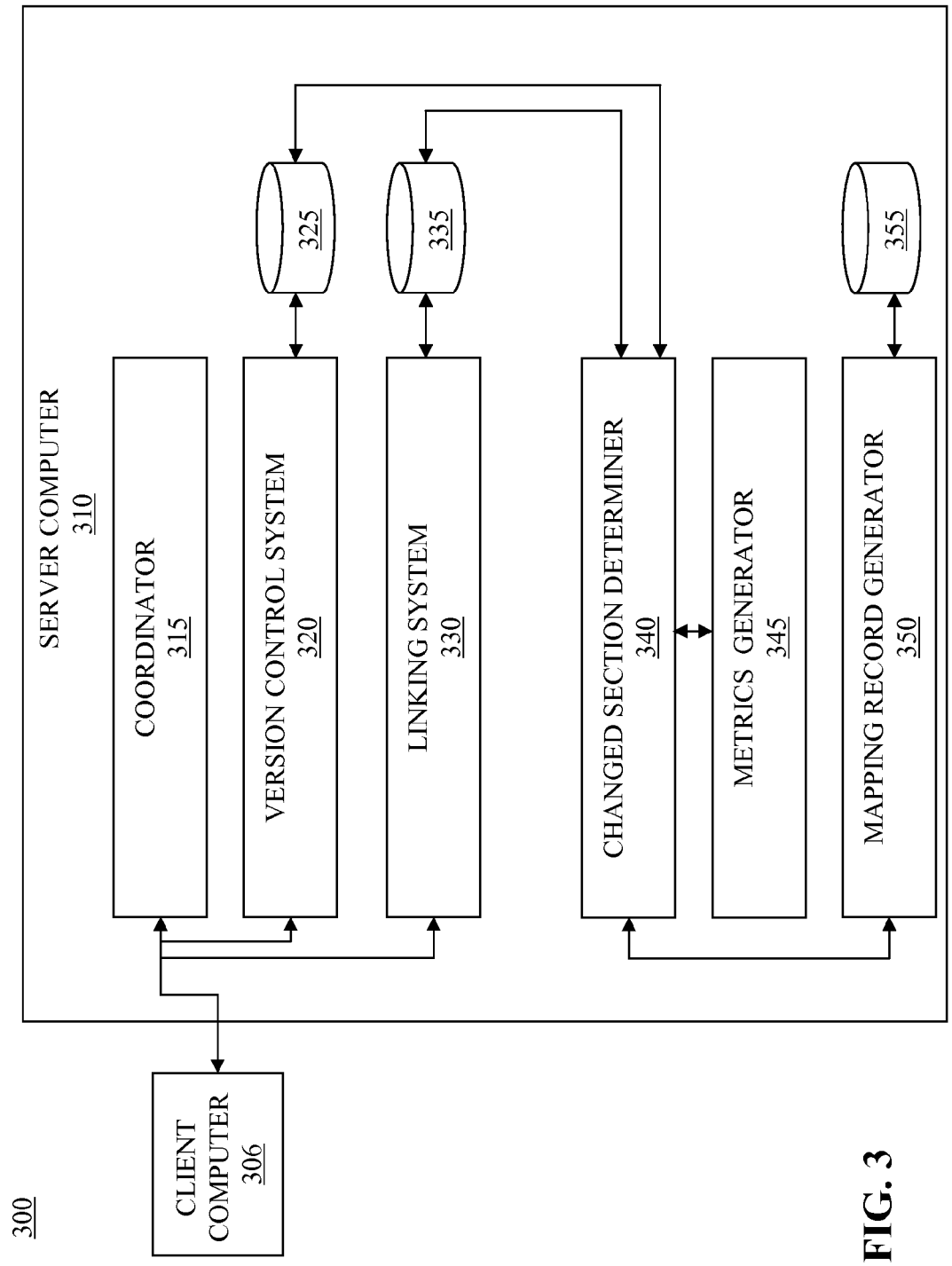
FIG. 3 illustrates a block diagram of a system for generating and maintaining links according to the preferred embodiment.

With reference now to FIG. 3, there is depicted a block diagram of a system for generating and maintaining links according to a preferred embodiment of the present disclosure. FIG. 3 illustrates system 300 comprising client computer 305 that is operable to interact with server computer 310. Server computer 310 comprises coordinator 315 and version control system 320 having access to third data store 325 for storing one or more files. In the example described herein, the files comprise code and associated documentation. However, the files can comprise any number of artefacts (e.g., code only; documentation only). Server computer 310 also comprises linking system 330 having access to fourth data store 335 for storing one or more links. Server computer 310 further comprises changed section determiner 340 for accessing third data store 325, fourth data store 335, metrics generator 345, and mapping record generator 350. Mapping record generator 350 accesses fifth data store 355 to store one or more mapping records.

Figure 4:
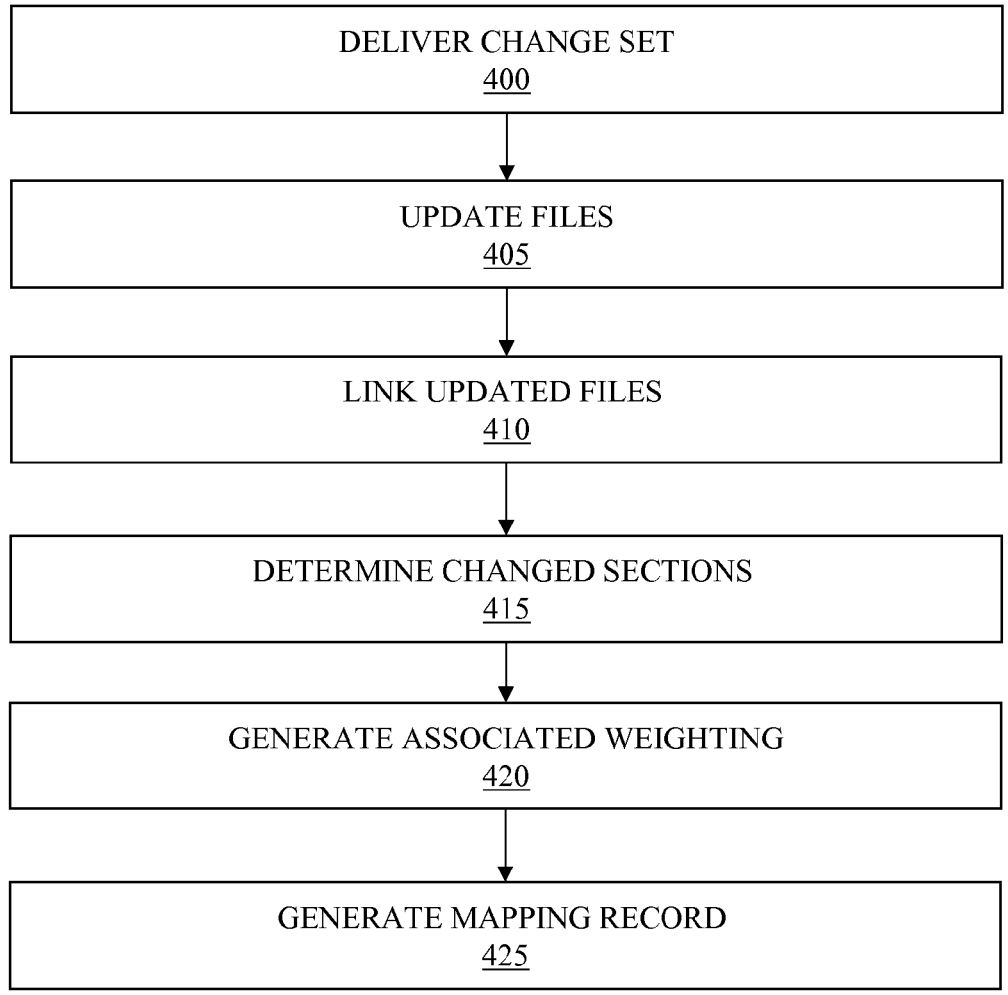
FIG. 4 illustrates a flow diagram showing the operational steps involved in a process for generating and maintaining links according to the preferred embodiment.

At FIG. 4 there is provided a flow diagram illustrating a process for generating links according to the preferred embodiment. A user uses client computer 305 to make changes to at least one of: a code and documentation. In the example herein, the changes are associated with a change item which has an identifier, such as a work item that is associated with a changed function in the code (e.g., a work item 6000 is associated with adding a new function to enable secure access to a web site and a work item 5000 is associated with adding a new method to an interface) or an entry in a change set which is typically smaller in scale than a work item. A work item may comprise a plurality of change sets. In the example herein, the change item comprises a work item.

At step 400, in the example herein, client computer 305 is used to send data comprising a changed code file (having an identifier), a changed documentation file (having an identifier or alternatively file identifiers associated with the changed files, and the changed information and/or associated offset data) and an associated work item identifier to server computer 310. In the example herein, coordinator 315 receives the data and passes the data to version control system 320.

Version control system 320 uses file identifiers associated with the changed code file and the changed documentation file in order to access the files in third data store 325 and find server-held versions of the files. Version control system 320 compares the changed code file and the changed documentation file with the server-held versions in order to determine the changes that the user has made (e.g., using a diff tool).

Thereafter, at step 405, version control system 320 updates the server-held versions in third data store 325 and stores the changed files as new versions. Preferably, the original server-held versions of the files are also maintained. It should be understood that determining the changes and updating the files can be carried out in a number of ways. At step 410, coordinator 315 invokes linking system 330 to create a link between the code file that was changed by the user and the documentation file that was changed by the user under the work item. Note that a link is associated with changes that result in updated versions of associated files. Linking system 330 stores the link (e.g., using a link identifier) in fourth data store 335.

At step 415, changed section determiner 340 is operable to access third data store 325 and fourth data store 335 in order to determine which sections of the code file(s) and the documentation file(s) were changed by the user. Changed section determiner 340 is also operable to determine further data regarding the changes (e.g., size of the changes, complexity of the changes). In one embodiment the further data is metadata. At step 420, metrics generator 345 generates weightings associated with the link between the code file and the documentation file that have been changed under the work item. That is, in more detail, metrics generator 345 generates a weighting associated with each changed section of the code file(s) and the documentation file(s). Metrics generator 345 communicates with changed section determiner 340 in order to obtain further data associated with the code changes (e.g., size, complexity, and code coverage analysis) and to obtain further data associated with the documentation changes (e.g., size, complexity, change in values, and nature of changes such as a change in tense). Metrics generator 345 uses the further data in order to create the weighting.

At step 425, mapping record generator 350 generates a set of mapping records associated with the link. The set of mapping records associated with the link comprises the same identifier. Mapping record generator 350 generates a mapping record for each changed section comprising a weighting associated with the changed section, an identifier, and a time stamp. Mapping record generator 350 stores mapping records in fifth data store 355. Advantageously, a set of mapping records associate a section(s) of code that is changed and a section(s) of documentation that is changed under the same work item, wherein the changes results in a new version of associated files.

A worked example of FIG. 4 will now be described. At step 400, in the example herein, the user uses client computer 305 to send data comprising a changed code file, a changed documentation file, and an associated work item identifier (e.g., 4000) to server computer 310. Example changes to the code file and the documentation file are shown below:

Changes_1
Code file version (ID 1234)—line 3-10
Documentation file version (ID 5678)—line 60-80

Coordinator 315 receives the data and passes the data to version control system 320. Version control system 320 uses file identifiers (e.g., "1234" and "5678") in order to find server-held versions of the files and further determines that a section comprising lines 3-10 have changed in the code file and that a section comprising lines 60-80 have changed in the documentation file. It should be understood that changes may not necessarily be made to every line of a section (e.g., if a user has made changes to lines 3 to 5 and lines 8-10 of a file, lines 3-10 may be treated as a single changed section).

Thereafter, at step 405, version control system 320 updates the server-held versions in third data store 325. In the example herein, the original versions (termed herein, version 1) of the files and the updated versions (termed herein, version 2) of the files are stored in third data store 325.

At step 410, coordinator 315 invokes linking system 330 to create a link between the code file that was changed by the user and the documentation file that was changed by the user under the work item. Note that a link is associated with changes that result in an updated version of a file. Linking system 330 stores the link (e.g., using a link identifier) in fourth data store 335. An example of a link is shown below:

Link_1
Link ID=4321 (Code file version=1234; Documentation file version=5678; Work_item=4000)

At step 415, changed section determiner 340 accesses third data store 325 and fourth data store 335 and determines that a section comprising lines 3-10 have changed in the code file and that a section comprising lines 60-80 have changed in the documentation file. Changed section determiner 340 also determines further data regarding the changes. In one example, further data comprises a size of the change in relation to a total size of a file (e.g., by dividing the number of lines changed by the total number of lines in the file).

In another example, further data comprising complexity of a change is estimated. In one example, a programming language associated with a code file is identified and thereafter, e.g., for complied languages such as Java (Java and all Java-based trademarks and logos are trademarks or registered trademarks of Oracle and/or its affiliates, a compiler is executed in order to obtain a parse tree for an updated version of the code file and a preceding version of the code file. Nodes of each parse tree are iterated in order to determine differences. For example, a number of nodes in the new tree that are not identical to ones in the previous tree could be counted. In another embodiment, a cyclomatic complexity of each of an updated version of the code file and a preceding version of the code file is calculated.

At step 420, metrics generator 345 generates weightings associated with the link (Link_1) between the code file and the documentation file that have been changed under the work item. Metrics generator 345 communicates with changed section determiner 340 in order to further obtain data associated with the code changes and further data associated with the documentation changes in order to create a weighting. It should be understood that any amount of further data regarding the changes can be taken into account in order to generate a weight and any number of weighting schemes can be used.

In the example herein, weights for each changed section associated with the link are generated using further data associated with size as shown below, wherein in the example, a greater weight (e.g., 20) is given to a change having a larger size:

Weights_1
Code file version (ID 1234)—java line 3-10; weight=7
Documentation file version (ID 5678)—java line 60-80; weight=20

The weight is a relative measure of how important a changed section is. For example, if a changed section has a higher weight, a user would want to be alerted to it in preference to a changed section having a lower weight.

At step 425, mapping record generator 350 generates one or more mapping records associated with the link, as provided by examples shown below:

Mapping record ID=123
Code file version ID=1234
Region start offset=3
Region end offset=10
Timestamp=12/4/12 07:00
Weight=7
Mapping record ID=123
Documentation file version ID=5678
Region start offset=60
Region end offset=80
Timestamp=12/4/12 07:05
Weight=20

Advantageously, a set of mapping records is associated with a changed section(s) to code and a changed section(s) to documentation associated with the same work item and associated with a link to a particular version of associated files. If changes associated with a link are received and if such changes have associated lines that overlap (wherein the overlap can have a preferred size), these changes can be merged for the purposes of detailing in a mapping record. Alternatively, mapping records can be created for each of the overlapping changes. In the example herein, there are further changes (step 400) associated with the same work item (ID=4000).

Example changes to the code file and the documentation file are shown below. In particular, the file versions have different identifiers from those denoted in Changes_1 as the further changes being made result in a different version of the files:

Changes_2
Code file version (ID 123456)—line 3-8
Documentation file version (ID 5678910)—line 20-23

As above, at step 405, version control system 320 updates the server-held versions in third data store 325. In the example herein, version 2 and the updated versions (termed herein, version 3) of the files are stored in third data store 325. Further, version 1 is also maintained.

At step 410, coordinator 315 invokes linking system 330 to create a second link which is stored by linking system 330 in fourth data store 335. An example of a link is shown below—note that as Changes_2 results in updated versions of the associated files, Link_2 has a different Link ID from those denoted in Link_1:

Link_2
  Link ID=4444 (Code file version=123456; Documentation file version=5678910; Work_item=4000)

At step 415, changed section determiner 340 accesses third data store 325 and fourth data store 335 and determines that lines 3-8 have changed in the code file and lines 20-23 have changed in the documentation file. Changed section determiner 340 also determines further data regarding size of the changes.

At step 420, metrics generator 345 generates weightings associated with the link (Link_2) by using the further data regarding the changes determined by changed section determiner 340.

In the example herein, weights for each changed section associated with the link are generated using further data associated with size as shown below, wherein in the example, a greater weight (e.g., 5) is given to a change having a larger size:
  Weights_2
  Code file version (ID 123456)—line 3-8; weight=5
  Documentation file version (ID 5678910)—line 20-23; weight=3

At step 425, mapping record generator 350 is operable to generate one or more mapping records associated with the link—note that the ID (e.g., 1234) of the mapping records associated with Changes_2 is different from the ID (e.g., 123) of the mapping records associated with Changes_1 to reflect the different resulting versions of the associated files—examples are shown below:
  Mapping record ID=1234
  Code file ID=123456
  Region start offset=3
  Region end offset=8
  Timestamp=12/4/12 09:00
  Weight=5
  Mapping record ID=1234
  Documentation file=ID 5678910
  Region start offset=20
  Region end offset=23
  Timestamp=12/4/12 09:05
  Weight=3

From the above examples, it can be seen that when changes are made to a code file and to a documentation file and result in updated versions of the files, such changes can be linked under a set of mapping records. This allows a user to have an overview of the impact on one file of changes made to another file. Further, each changed section is advantageously weighted such that a user can understand the relative importance/significance of the changed section on each of the impacted sections and focus his/her attention appropriately, thus ignoring a majority of irrelevant results. Further still, such weightings can be used in another process of the preferred embodiment for analyzing links as will be detailed below. In one embodiment, a mapping record is linked to other mapping records associated with changed sections via a link.

In an example, when a user activates a preferred implementation in a code file, the preferred implementation generates a call hierarchy using, for example, static analysis, code coverage to scan through each of the changes to the code file found, checking for links (such as within a documentation file). The preferred implementation renders a tree for the hierarchy in conjunction with the further data regarding the changes and the tree is augmented with the documentation file as a child node of a parent node representing the code file. Preferably, if the user activates the child node, the documentation file is opened in an appropriate editor.

A system and process for analyzing links will now be described. When changing code (for example) a developer can carry out a manual impact analysis on the code in order to find out which other artefacts may be affected by the code changes. If another artefact (e.g., an associated documentation) is required to be changed, a developer may not necessarily remember to update the documents or indeed know which parts of the documentation require updating. Advantageously, the system and process for analyzing links according to the preferred embodiment aids with the problem above in that, in response to making a change to a file, a user is able to review sections of the file and/or sections of other files which may require updating also.

Figure 5:
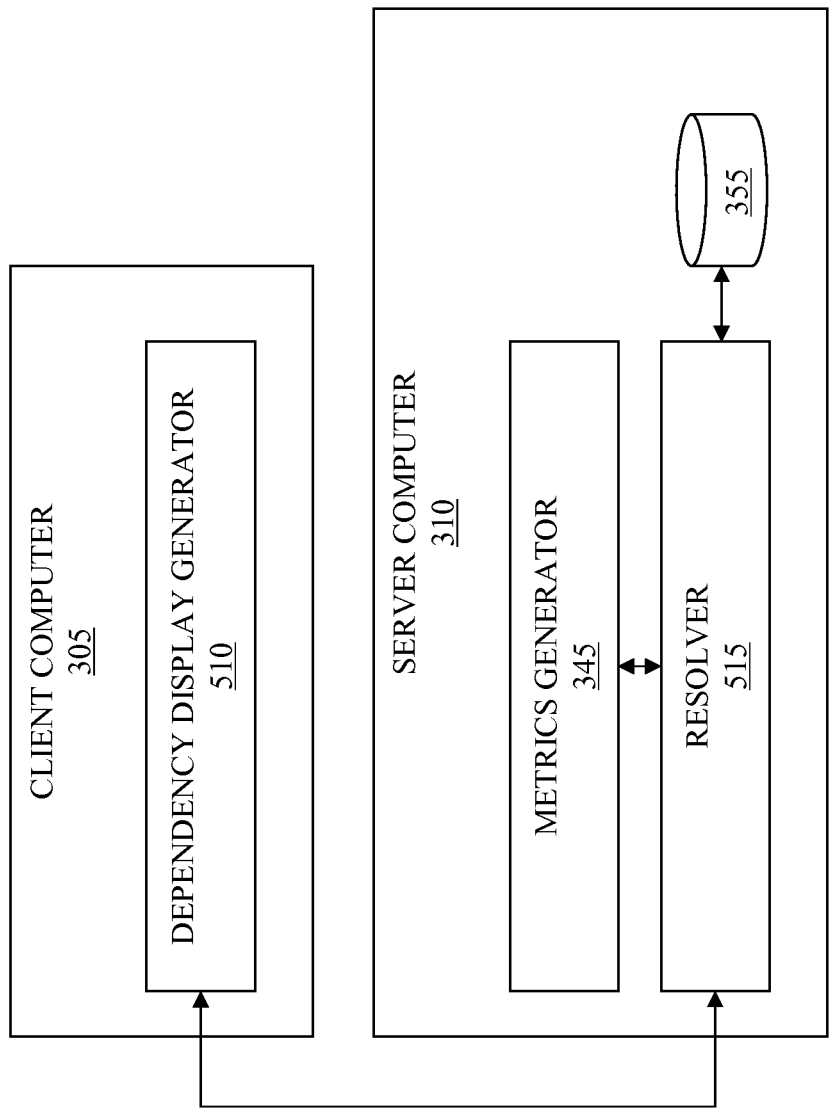
FIG. 5 illustrates a block diagram of a system for analyzing links according to the preferred embodiment.

With reference to FIG. 5, there is provided a more detailed block diagram of a system for analyzing links according to the preferred embodiment. As illustrated there is client computer 305 which comprises dependency display generator 510. Further functions of the client computer 305 depicted in FIG. 3 have been omitted in FIG. 5 for clarity. Server computer 310 comprises metrics generator 345 and resolver 515 operable to access fifth data store 355 for storing one or more mapping records. Further functions of the server computer 310 depicted in FIG. 3 have been omitted in FIG. 5 for clarity.

Figure 6:
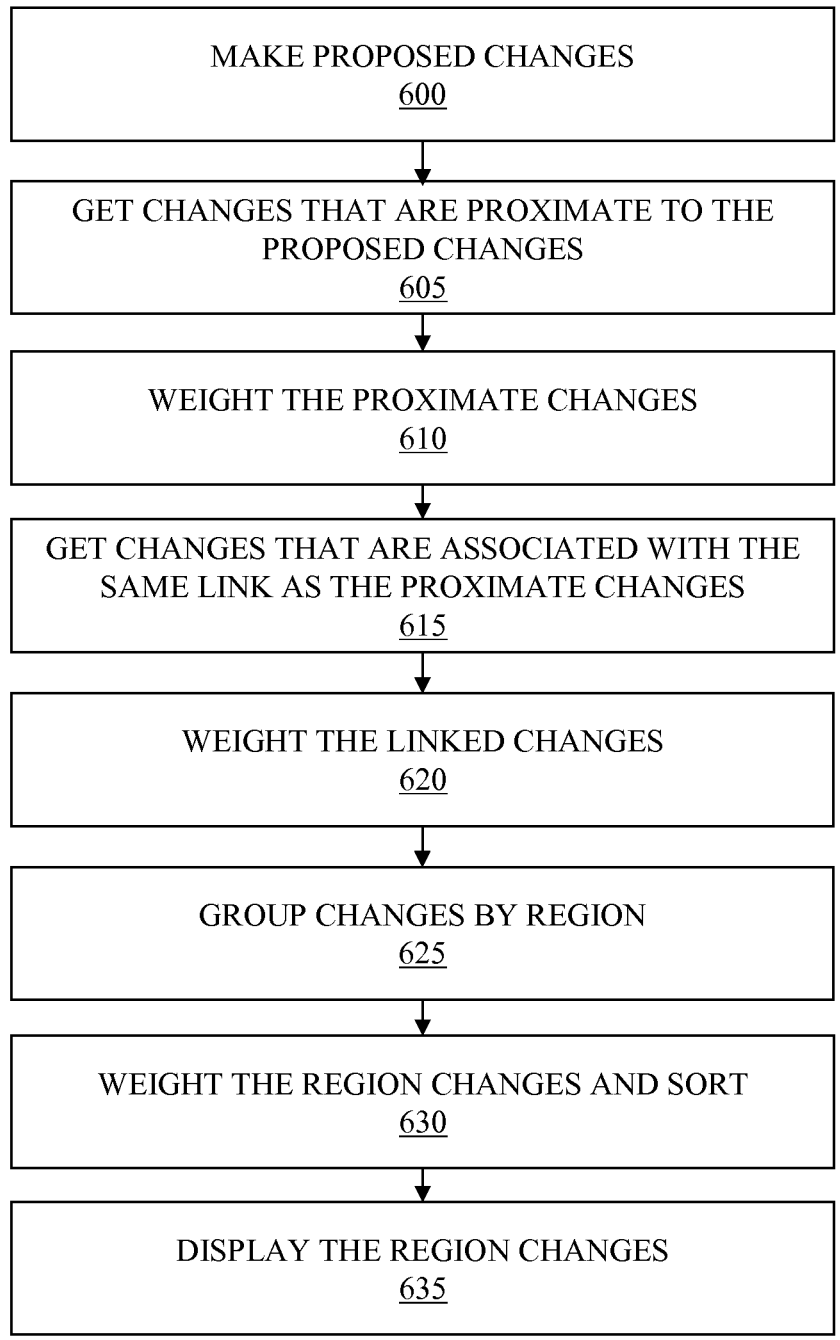
FIG. 6 illustrates a flow diagram showing the operational steps involved in a process for analyzing links according to the preferred embodiment.

With respect now to FIG. 6 there is illustrated a flow diagram showing the operational steps involved in a process for analyzing links according to the preferred embodiment. At step 600, a user uses client computer 305 to make changes (termed herein, proposed changes) to code only. The user sends data comprising the changes and the associated work item identifier to server computer 310. Example changes to the code file are shown below:
  Changes_3
  (1) Code file version (ID trunk/Test/src/com/test/Test.java)—line 48-51
  (2) Code file version (ID trunk/Test/src/com/test/Types.java)—line 7-9
  (3) Code file version (ID trunk/Test/src/com/test/Types.java)—line 17-20

Additionally, the first proposed change is shown in greater detail in FIG. 7. With respect to FIG. 7, there is illustrated a block diagram showing the first proposed change provided above, according to the preferred embodiment. As provided in FIG. 7 there is illustrated proximate change mapping record 1 700 and region record 1 705.

The second and third proposed changes are shown in greater detail in FIG. 8. With respect to FIG. 8, there is illustrated a block diagram showing the first second and third proposed changes provided above, according to the preferred embodiment. At FIG. 8 there is illustrated proposed change 2 800 and proximate change mapping record 2 805. Also illustrated in FIG. 8 is third proposed change 810.

Returning now to FIG. 6, version control system 320 updates the server-held versions in the third data store 325. Coordinator 315 invokes the linking system 330 to create a link between the changed sections of the code file (further details of the link are omitted herein for clarity) which is stored by linking system 330 in fourth data store 335. Changed section determiner 340 accesses third data store 325 and fourth data store 335 in order to determine which sections have changes and determine further data regarding the changes.

Metrics generator 345 optionally generates weightings associated with the link by using the further data regarding the changes determined by changed section determiner 340 and mapping record generator 350. Metrics generator 345 is further operable to generate mapping records associated with the link. If weightings are not generated, a default value of one (1) is used in the algorithms that follow.

A greater weight is given to more significant changes. A greater weight may be assigned based on, for example, a size or complexity of a change. In another embodiment, a greater weight can be assigned based on a more recent change. Examples of the mapping records are shown below:

Proposed change mapping record 1
Mapping record ID=ABC
Code file ID=trunk/Test/src/com/test/Test.java
Region start offset=48
Region end offset=51
Timestamp=20/4/12 09:00
Weight=30
Proposed change mapping record 2
Mapping record ID=ABC
Code file ID=trunk/Test/src/com/test/Types.java
Region start offset=7
Region end offset=9
Timestamp=20/4/12 10:00
Weight=1
Proposed Change mapping record 1
Mapping record ID=ABC
Code file ID=trunk/Test/src/com/test/Types.java
Region start offset=17
Region end offset=20
Timestamp=20/4/12 11:30
Weight=5

Alternatively, the user can, for example, select areas of the code to which he/she wishes to make proposed changes. Mapping record generator 350 then uses the selections to generate dummy proposed change mapping records each having a default weight of 1. Alternatively, the user can call by activating an element associated with a code file by selecting a method from a call hierarchy and requesting a list of callers associated with the selected method. In addition to returning the callers, mapping record generator 350 generates one or dummy proposed change mapping records each having a default weight of 1 associated with an area of code associated with the element.

At step 605, resolver 515 accesses fifth data store 355 and runs one or more queries in order to retrieve mapping records associated with previously made changes that are proximate to the proposed changes. In one example, resolver 515 runs one or more queries to obtain mapping records associated with changes that are located in a section that is within 50% of the size of the proposed change. For example, a proposed change from lines 20-30 would match proximate changes comprising lines 15-35 and lines 25-26 but not lines 20-22.

In a first query associated with the first proposed change comprising "select all mapping records where file id=trunk/Test/src/com/test/Test.java; start offset is in the range 46-50; end offset is in the range 49-55", the following mapping record is returned:

Proximate change mapping record 1
Mapping record ID=XYZ
Code file ID=trunk/Test/src/com/test/Test.java
Region start offset=46
Region end offset=52
Timestamp=18/4/12 10:00
Weight=43

In a second query associated with the second proposed change comprising "select all mapping records where file id=trunk/Test/src/com/test/Types.java; start offset is in the range 5-9; end offset is in the range 7-11", the following mapping record is returned:

Proximate change mapping record 2
Mapping record ID=XYZ
Code file ID=trunk/Test/src/com/test/Types.java
Region start offset=8
Region end offset=9
Timestamp=17/4/12 11:30
Weight=13

Fifth data store 355 also comprises the following record having the same mapping record ID as the two mapping records above:

Change mapping record 1
Mapping record ID=XYZ
Document file ID=file id: trunk/Docs/src/Installation.xml
Region start offset=28
Region end offset=48
Timestamp=17/4/12 12:00
Weight=34

In a third query comprising "select all mapping records where file id=trunk/Test/src/com/test/Types.java" where the start offset is in the range 15-19 and the end offset is in the range 18-22, no mapping records (including change mapping record 1) are returned.

Figure 9:
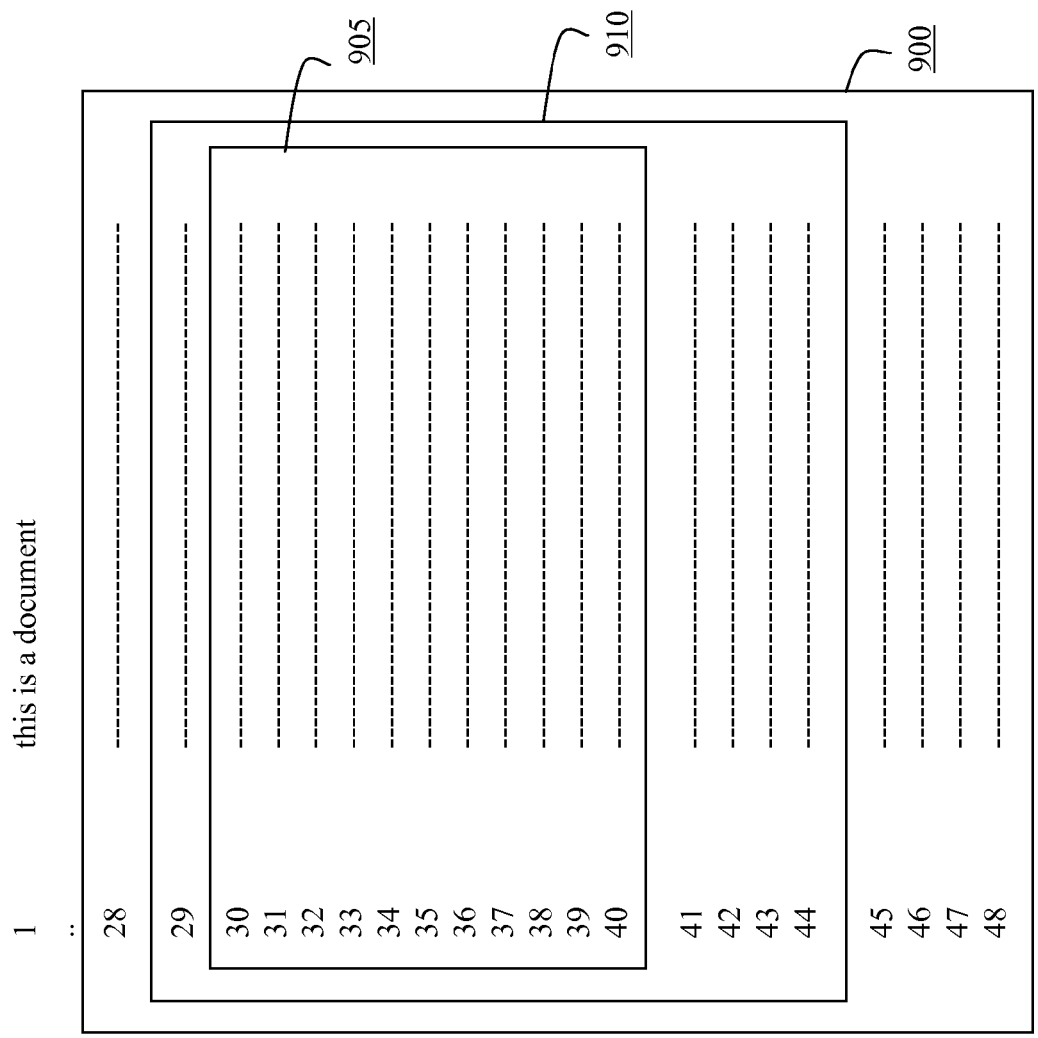
FIG. 9 illustrates a block diagram showing an exemplary change mapping record 1, according to the preferred embodiment.

Change mapping record 1 900 is shown in greater detail in FIG. 9. With respect to FIG. 9, there is illustrated a block diagram showing an exemplary change mapping record 1, according to the preferred embodiment. With respect to FIG. 9, there is illustrated change mapping record 1 900. Within change mapping record 1 there is also provided proximate change mapping record 3 905 and region record 4 910.

Returning again to FIG. 6, at step 610, metrics generator 345 assigns a mapping record associated with a proximate change a context specific weight which represents the significance of the mapping record in comparison with a proposed change. A context specific weight is based on, for example, a weight of a proposed change. In this embodiment, if a proposed change to a section is significant, by using a weight of the proposed change, significance can also be placed on proximate (previous) changes that have been made to the section since a weight of a proximate change is also a factor in determining a context specific weight. In another embodiment, a context specific weight is based on a weight of a proximate change. In this embodiment, if a proximate change to a section is significant, by using a weight of the proximate change, significance can also be placed on a proposed change that has been made to the section since a weight of a proposed change is also a factor in determining a context specific weight. In still another embodiment, a context specific weight is based on overlap between a section associated with the proposed change and a section associated with the proximate change. This results in a mapping record associated with a proximate change having a more significant overlap with a proposed change to be treated as more significant.

In an example, a context specific weight is obtained by summing a weight of a proposed change and a weight of a proximate change and multiplying the sum by a percentage overlap between the changes as a proportion of a total number of lines associated with the changes, as provided by the following formula:

$$\text{context specific weight} = \text{proposed weight} + \text{returned weight} * (\text{overlapSize}/(\text{sum}(\text{sizes})))$$

For example, for the first proposed change and the associated first proximate change, a context specific weight for the mapping record of the first proximate change is calculated as follows:

Proximate change mapping record 1 context specific weight:

30+43*(4/(4+7))=26.55

For the second proposed change and the associated second proximate change, a context specific weight for the mapping record of the second proximate change is calculated as follows:

Proximate change mapping record 2 context specific weight:

1+13*(2/3+2)=5.6

Context specific weights can be used to decide which proximate changes to treat as the most important ones. Preferably, if multiple proximate changes are returned, proximate changes with relatively low context specific weights can be filtered out. Such low context specific weights can indicate a relatively low weight of a proposed change; a weight of a proximate change and/or percentage overlap.

At step 615, resolver 515 executes a query in order to obtain each mapping record associated with the same mapping ID as the returned proximate change mapping records. This allows mapping records associated with the same link as that associated with the mapping records of the proximate changes to be determined such that a user has an expanded overview of changes that may be related to the proposed changes (wherein such changes may not necessarily be proximate to the proposed changes but are related to the proximate changes). For example, resolver 515 issues a query comprising "SELECT all where mapping ID=XYZ" resulting in a return of: Proximate change mapping record 1; Proximate change mapping record 2 and Change mapping record 1.

At step 620, metrics generator 345 weights one or more mapping records associated with the link with an importance weight which represents the significance of the one or mapping records with the link in comparison with a proposed change. An importance weight is calculated using a multiplication of a weight of a mapping record associated with the link and the context specific weight—using the weight associated with the mapping record associated with the link allows importance to be placed on changes that are more significant over changes which are more trivial. Note that as weights of proximate changes have already been used as a factor in deriving a context specific weight, more significance is placed on such proximate changes over changes that are associated with the proximate changes under the same link. The importance weight is used to carry through data about which changes associated with the link are more significant such that relevant results can be displayed at a later stage to the user (this step will be discussed in more detail herein). An importance weight is calculated for each mapping record associated with the link against each context specific weight—this is because proximate changes associated with the same mapping record ID represents a set of related changes and significance should be given to this. Examples of importance weights are shown below:

Proximate change mapping record 1 importance weights:

43*26.55=1141.7

43*5.6=240.8

Proximate change mapping record 2 importance weights:

34*26.55=902.7

34*5.6=190.4

Change mapping record 1 importance weights:

13*26.55=345.2

13*5.6=72.8

In the example above, based on the proposed changes, proximate changes committed under the same work item have been retrieved. Equally, proximate changes committed under different work items can be retrieved and the above process would also be applied to such changes.

At step 625, resolver 515 generates one or more region records. In one embodiment, a region record comprises an aggregation of proximate changes and further changes wherein such changes overlap. For example, resolver 515 generates the one or more region records in accordance with one or more rules. The one or more rules can include, for example, a rule that defines that specifies if a start offset and an end offset of a changed section is within 50% proximity of another changed section, associated mapping records will be merged into a single region record. The creation of one or more region records allows for a simplification of display of results as if such changes were each displayed separately. This can result in several results associated with the same or a similar section causing problems for the user, such as making the results difficult for the user to interpret or the most significant results not being readily apparent.

In the example provided herein, since proximate change mapping record 1, proximate change mapping record 2, and change mapping record 1 are associated with different files (and thusly have different file IDs), no overlap exists. Thus, resolver 515 generates a region record associated with each of the mapping records wherein: region record 1 is associated with proximate change mapping record 1, region record 2 is associated with proximate change mapping record 2, and region record 3 is associated with change mapping record 1.

In another example, based on a proposed change, a proximate change associated with a further link is found and its associated mapping record is shown below:

Proximate Change mapping record 3
Mapping record ID=145
Code file ID=trunk/Docs/src/Installation.xml
Region start offset=30
Region end offset=40
Timestamp=20/4/12 16:30
Weight=20

In the another example herein, a section (especially lines 30-40) associated with the proximate change mapping record 3 overlaps entirely with a section (lines 28-48) associated with change mapping record 1. Thus, at step 625, resolver 515 generates a region record (region record 4) wherein: region record 4 is associated with proximate change mapping record 3 and change mapping record 1. Preferably, resolver 515 populates the region record with an average start offset and an average end offset based on an average of the start offsets and the end offsets of the associated mapping records.

At step 630, metrics generator 345 populates the region record with a region importance weight. A region importance weight is the sum of each of the importance weights of the mapping records associated with the region record. This allows more significant region records to be highlighted.

In the remainder of the example below, region record 1, region record 2, and region record 4 will be used. Representations of on record 1, region record 2, and region record 4 are shown below:

Region record 1
Region record ID=888
Code file ID=trunk/Test/src/com/test/Test.java
Average region start offset=46
Average region end offset=52
Region Importance Weight=1141.7+240.8=1382.5
Region record 2
Region record ID=777
Code file ID=trunk/Test/src/com/test/Types.java
Average region start offset=8
Average region end offset=9
Region Importance Weight=902.7+190.4=1113.1
Region record 4
Region record ID=666
Code file ID=trunk/Docs/src/Installation.xml
Average region start offset=29
Average region end offset=44
Region Importance Weight=345.2+72.8+20=438

Region record 1 705 is shown in greater detail in FIG. 7. Region record 2 805 is shown in greater detail in FIG. 8. Region record 4 910 is shown in greater detail in FIG. 9.

Preferably, resolver 515 sorts (at step 630) the region records in order of region importance weight. The results of the sorting are depicted below:

1. Region record 1=1382.5
2. Region record 2=1113.1
3. Region record 4=438

This sorting also allows some order to be imposed on the region records obtained as several such records could be obtained, potentially causing the user difficulty in interpretation. At step 635, resolver 515 passes the sorted list to dependency display generator 510 which displays the list.

In the example herein, dependency display generator 510 displays a list of results starting with a pointer to the file Installation.xml and the associated lines 29-44. Next, dependency display generator 510 displays a pointer to the file Test.java and the associated lines 46-52 . Finally, dependency display generator 510 displays a pointer to the file Types.java and the associated lines 8-9. Preferably, display of the results can be executed in a variety of ways (e.g., if a user selects a result, the associated lines are highlighted within the file). In the preferred embodiment, dependency display generator 510 is operable to truncate the list for clarity. Furthermore, although resolver 515 sorts the list above based on size of region, resolver 515 can sort the list on any of the further data (e.g., recency of changes, similarity of the changes, and complexity of the changes).

Advantageously, the preferred embodiment allows a user, in response to making a change to a file, to be able to review sections of the file and/or sections of other files which may require updating also. For example, with reference to FIGS. 7-9, and as provided in the example above, in response to a user makes a change (e.g., proposed change 1 700 and proposed change 2 800), the user is able to view a sorted list of further sections of files which may require updating (e.g., region record 1 705, region record 2, and region record 4 910).

Any combination of one or more computer readable medium(s) may be utilized. The computer readable medium may be a computer readable signal medium or a computer readable storage medium (or storage device). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present disclosure may be written in any combination of one or more programming languages, including an object oriented programming language such as Java (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, executable by a processor of a data processing system, for managing changes to one or more files, the method comprising:
    determining a plurality of sections associated with one or more files that have changed, wherein the one or more files further comprises at least one code file and at least one documentation file;
    determining metadata regarding a nature of the one or more changes to the plurality of sections, wherein the one or more changes resulted in an updated version of the one or more files;
    generating, using the metadata, a first weight associated with each of the plurality of sections that have changed;
    assigning a greater first weight to a particular section of the plurality of sections that have changed based on at least one of: a larger size of a change, a greater complexity of a change, and a more recent change; and
    generating a set of mapping records comprising a mapping record for each of the plurality of sections that have changed, wherein a first mapping record of the set of mapping records comprises data associated with the first weight, wherein the first mapping record is associated with a particular version of the one or more files and, wherein the first mapping record is linked to each other mapping record in the set of mapping records that is associated with one or more other changed sections via a link, wherein the link is associated with the one or more changes, and wherein the set of mapping records associated with the link comprises the same identifier.

2. The method of claim 1, wherein the metadata is associated with at least one of: a size of a change, a complexity of a change, and a recency of a change.

3. The method of claim 1, further comprising:
    in response to receiving a proposed change, retrieving one or more proximate change mapping records associated with one or more previous changes that are proximate to the proposed change.

4. The method of claim 3, further comprising:
    assigning a second weight to each of the one or more proximate change mapping records.

5. The method of claim 3, further comprising:
    obtaining one or more further mapping records associated with one or more further changes having a same link as the one or more proximate change mapping records.

6. The method of claim 5, further comprising:
    assigning a third weight to each of the one or more further mapping records.

7. The method of claim 5, further comprising:
    generating one or more region records, wherein a region record is an aggregation of changes where an overlap exists between each of the one or more previous changes and the one or more further changes, wherein the one or more previous changes and the one or more further changes do not require the same link.

8. The method of claim 7, further comprising:
    assigning a fourth weight to each of the one or more region records.

9. The method of claim 7, further comprising:
    sorting the one or more region records.

10. The method of claim 9, further comprising:
    presenting a view of the sorted one or more region records, wherein the sorted one or more region records identify the one or more further changes.

11. The method of claim 1, wherein: the greater first weight is assigned to the particular section based on the greater complexity of the change; and
    generating the first weight associated with each of the plurality of sections that have changed further comprises: calculating a cyclomatic complexity of each of an updated version of the one or more files and a preceding version of the one or more files.

12. The method of claim 1, wherein the one or more other changed sections include one or more sections in one or more other files, the method further comprising:
    presenting a view of one or more other changes to the one or more other changed sections based on the one or more changes to the plurality of sections.

* * * * *